United States Patent [19]

Corbett et al.

[11] Patent Number: 4,832,366
[45] Date of Patent: May 23, 1989

[54] ADJUSTABLE SHOULDER BELT

[75] Inventors: Thomas J. Corbett, Sterling Heights; Vaughn D. Everhart, Utica; Michele A. Smith, Davisburg, all of Mich.

[73] Assignee: Saturn Corporation, Troy, Mich.

[21] Appl. No.: 161,959

[22] Filed: Feb. 29, 1988

[51] Int. Cl.$^4$ ............................................. B60R 22/16
[52] U.S. Cl. ..................................... 280/808; 297/483
[58] Field of Search ................ 280/808, 801; 297/483, 297/468, 473

[56] References Cited

U.S. PATENT DOCUMENTS

| 3,567,247 | 3/1971 | Sobkow et al. | 280/808 |
|---|---|---|---|
| 3,866,975 | 2/1975 | Fricko | 297/479 |
| 4,236,755 | 12/1980 | Pollitt et al. | 280/808 |
| 4,256,329 | 3/1981 | Winnale | 280/808 |
| 4,319,769 | 3/1982 | Compeau | 280/808 |
| 4,461,510 | 7/1984 | Cunningham et al. | 297/483 |
| 4,486,031 | 12/1984 | Holler et al. | 280/802 |
| 4,607,864 | 8/1986 | Kouketsu et al. | 280/808 |
| 4,730,875 | 3/1988 | Yoshitsugu | 297/483 |

FOREIGN PATENT DOCUMENTS 2449105 4/1975 Fed. Rep. of Germany ...... 297/483

Primary Examiner—Charles A. Marmor
Assistant Examiner—Karin Tyson
Attorney, Agent, or Firm—Charles E. Leahy

[57] ABSTRACT

An auxiliary anchorage for a shoulder belt is comprised of an anchor ring which is mounted on a structural member of the vehicle body by an anchor belt which passes through an opening in the seat back cushion. The anchor ring is C-shaped and has an entry opening smaller than the width of the shoulder belt. The shoulder belt is removably inserted into the opening in the C-shaped ring. As the belt unfolds the belt obstructs the opening of the C-shaped ring. The C-shaped ring is mounted at a height lower than the shoulder belt retractor so that the C-shaped ring effectively lowers the height of the shoulder belt anchorage whereby the shoulder belt dwells at an adjusted angle of repose. The anchor belt may be stiffened by a plastic sheath so that the C-shaped ring is held at a readily accessible presence relative the opening in the seat back cushion and may be swung into a stored position in the opening in readiness for subsequent withdrawal from the opening to enable the insertion of the shoulder belt therein.

3 Claims, 1 Drawing Sheet

ADJUSTABLE SHOULDER BELT

The invention relates to the shoulder belt of an occupant restraint system and more particularly provides an auxiliary anchorage by which the angle of repose of the shoulder belt may be adjusted.

BACKGROUND OF THE INVENTION

It is known to provide a three point occupant restraint belt in a motor vehicle for restraining a seated occupant on the seat. Such three point belt systems typically include a lap belt extending across the lower torso and a shoulder belt extending diagonally across the upper torso. The upper end of the shoulder belt is commonly mounted by a retractor which is mounted on a structural component of the vehicle body, such as the "B" pillar in front seat belt installations, or the "C" pillar or package shelf in rear seat belt installations. The lower end of the shoulder belt is commonly connected to a buckle mounted inboard the occupant so that the shoulder belt extends diagonally across the occupant. The locations of the buckle and the retractor determine the diagonal angle of repose of the restraint belt across the occupant's upper torso.

It may be desirable to provide an adjustable anchorage for the upper end of the shoulder belt so that the angle of repose may be varied. Accordingly, the prior art has taught mounting the upper end of the shoulder belt on an anchorage which is vertically adjustable.

The present invention provides an anchorage which may be selectively employed to vary the effective height of the anchorage point in rear seat shoulder belt installations and thereby adjust the angle of repose of the shoulder belt across the torso.

SUMMARY OF THE INVENTION

According to the present invention an auxiliary anchorage for a shoulder belt is comprised of an anchor ring which is mounted on a structural member of the vehicle body by an anchor belt which passes through an opening in the seat back cushion. The anchor ring is C-shaped and has an entry opening smaller than the width of the shoulder belt. The shoulder belt is removably inserted into the opening in the C-shaped ring. As the belt unfolds the belt obstructs the opening of the C-shaped ring. The C-shaped ring is mounted at a height lower than the shoulder belt retractor so that the C-shaped ring effectively lowers the height of the shoulder belt anchorage whereby the shoulder belt dwells at an adjusted angle of repose. The anchor belt may be stiffened by a plastic sheath so that the C-shaped ring is held at a readily accessible presence relative the opening in the seat back cushion and may be swung into a stored position in the opening in readiness for subsequent withdrawal from the opening to enable the insertion of the shoulder belt therein.

Accordingly, the object, feature and advantage of the present invention resides in the provision of an auxiliary shoulder belt anchorage comprised of a C-shaped ring mounted on the seat back and receiving the shoulder belt to adjust the diagonal position of the belt.

A further object, feature and advantage of the invention resides in the provision of a C-shaped ring mounted on a vehicle structure by a sheathed anchor strap reaching through the cleft between adjacent cushion portions of the seat back so that the sheath and C-shaped ring may be stored in the cleft and then swung to an extended position in which the C-shaped ring is enabled to receive the intermediate portion of the shoulder belt and effectively adjust the diagonal angle of repose of the shoulder belt.

BRIEF DESCRIPTION OF THE DRAWINGS

These and other features, objects and advantages of the invention will become apparent upon consideration of the description of the preferred embodiment and the appended drawings in which.

DESCRIPTION OF THE PREFERRED EMBODIMENT

Figure 1:
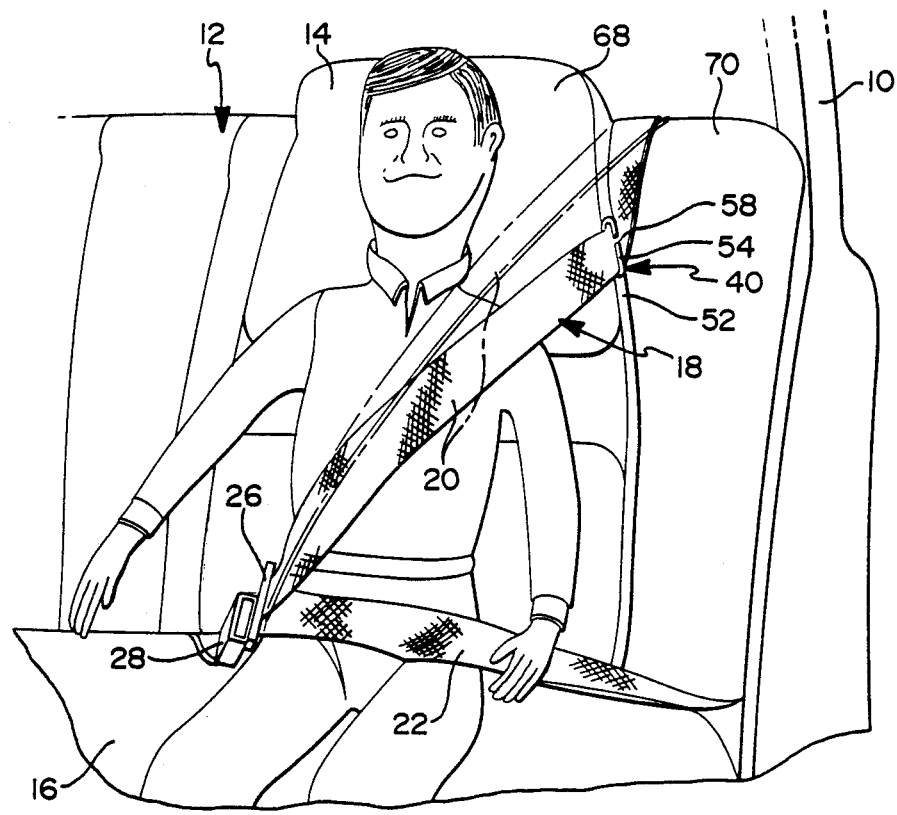
FIG. 1 is a perspective view of a vehicle body having the restraint system of the present invention.

Referring to FIG. 1, there is shown a vehicle body 10 having a rear seat 12 including a seat back cushion 14 and a seat bottom cushion 16. An occupant is restrained in the seat by a restraint belt system generally indicated at 18 which includes a shoulder belt 20 and a lap belt 22. The shoulder belt's inboard end is suitably connected with a latch plate 26 which is engaged in a releasable seat belt buckle 28. The inboard end of the lap belt 22 is also suitably connected with the latch plate 26 so that the lap belt 22 extends across the occupant's lower torso and cooperates with the shoulder belt 20 to restrain the seated occupant.

Figure 2:
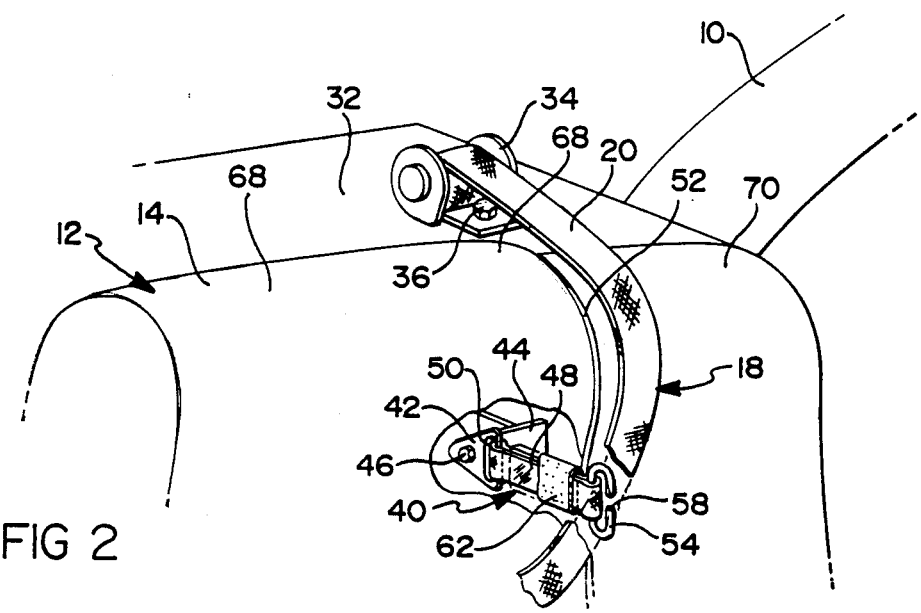
FIG. 2 is another perspective view of a seat back showing the retractor mounting the upper end of the belt and having the seat cushion cut away to show the mounting of the auxiliary anchorage device which modifies the angle of repose of the shoulder belt.

Referring to FIG. 2, it is seen that the upper end of the shoulder belt 20 is mounted on the vehicle body package shelf 32 by a retractor 34 and anchor bolt 36 so that the belt 20 reaches over the seat back 14 and across the occupant's upper torso along a path shown in phantom line in FIG. 1.

FIGS. 1 and 2 show the angle of repose of the shoulder belt 20 adjusted by an auxiliary anchorage device generally indicated at 40. The auxiliary anchorage device includes a mounting bracket 42 which is mounted on the vehicle body structural member 44 by an anchor bolt 46. An anchor belt 48 is comprised of a loop of restraint belt which passes through an aperture 50 in the anchor bracket 42. The anchor belt 48 passes through an opening 52 in the seat back cushion 14 and receives a C-shaped anchor ring 54. The C-shaped anchor ring 54 has an opening 58 of lesser dimension than the width of the shoulder belt 20. A sheath 62 of molded plastic surrounds and stiffens the anchor belt 48 to establish the C-shaped ring 54 at an accessible location in the opening 52.

When it is desired to adjust the angle of the shoulder belt, the shoulder belt is inserted edgewise or folded through the opening 58 of the C-shaped ring 54. The belt itself obstructs the opening 58 to effectively retain the belt in the C-shaped ring. Furthermore, the C-shaped ring 54 loosely encircles the belt 20 so that the belt 20 may slide through the ring as the belt is wound and unwound from the retractor 34 during occupant movement upon the seat. The shoulder belt 20 may be removed from the C-shaped ring by threading the edge of the belt through the opening 58 for removal.

The opening in the seat back cushion 14 may be conveniently provided by a seat back cushion 14 comprised of separate adjacent cushions 68 and 70 so that the opening 52 is provided by the cleft between the adjacent cushions 68 and 70.

It will be appreciated that the structural integrity of the seat belt system is assured by the buckle 28 and the retractor 34 so that the occupant need not be concerned about the possibility of the shoulder belt working its way through the opening 58 of the C-shaped ring 54.

The C-shaped ring 54 may be conveniently stored and concealed from view by swinging the sheath 62 up or down to conceal the C-shaped ring in the cleft between the adjacent cushions 68 and 70.

Thus it is seen that the invention provides an adjuster for the shoulder belt of a rear seat occupant restraint system.

It will be appreciated that the upper end of the shoulder belt 20 may be bolted directly to the package shelf without a retractor. Furthermore, the anchor belt 48 may be a metal strap instead of a belt. In addition, the sheath 62 surrounding the anchor belt 48 is desirable but not necessary to the use of this invention.

The embodiments of the invention in which an exclusive property or privilege is claimed are defined as follows:

1. In a vehicle having a seat back cushion mounted on a vehicle structure and having an associated restraint system for restraining an occupant relative the seat back and including a shoulder belt extending from an upper shoulder belt anchorage attached to the vehicle structure and disposed diagonally over the occupant shoulder, the improvement comprising:

anchor means mounted on the vehicle structure at an elevation lower than the upper shoulder belt anchorage;

an opening in the seat back cushion overlying the anchor means;

an anchor belt having one end attached to the anchor means and another end reaching through the opening in the seat back cushion;

and a C-shaped ring attached to the another end of the anchor belt, said C-shaped ring having an entry opening by which the shoulder belt may be removably inserted into the C-shaped ring so that the upper anchorage of the shoulder belt is effectively lowered from the height of the shoulder belt anchorage to the height of the anchor means whereby the shoulder belt dwells at an adjusted angle of repose.

2. The combination of claim 1 in which the anchor belt is stiffened by a plastic sheath associated therewith so that the C-shaped ring is held at a stiffened length from the anchor bracket to maintain a readily accessible presence relative the opening in the seat back cushion.

3. The combination of claim 2 in which the opening in the seat back cushion is provided by the cleft between adjacent cushion portions and in which the sheath permits the C-shaped ring to be swung into a stored position in the cleft in readiness for withdrawal from the cleft to enable insertion of the shoulder belt therein.

* * * * *